United States Patent [19]

Drost

[11] 4,394,859
[45] Jul. 26, 1983

[54] CENTRAL SOLAR ENERGY RECEIVER

[76] Inventor: M. Kevin Drost, Richland, Wash., granted to U.S. Department of Energy under the provision of 42 U.S.C. 2182

[21] Appl. No.: 315,397

[22] Filed: Oct. 27, 1981

[51] Int. Cl.$^3$ .............................................. F24J 3/02
[52] U.S. Cl. .................................. 126/438; 126/446; 126/451
[58] Field of Search ............... 126/429, 432, 438, 439, 126/441, 442, 443, 446, 449, 450, 451; 165/181, 182

[56] References Cited

U.S. PATENT DOCUMENTS

| 3,892,433 | 7/1975 | Blake | 126/438 |
|---|---|---|---|
| 3,905,352 | 9/1975 | Jahn | 126/438 |
| 3,974,824 | 8/1976 | Smith | 126/441 |
| 4,043,315 | 8/1977 | Cooper | 126/446 |
| 4,138,997 | 2/1979 | Laporte | 126/446 |
| 4,180,055 | 12/1979 | Hudnall | 126/446 |
| 4,214,572 | 7/1980 | Gonder | 126/438 |
| 4,248,211 | 2/1981 | Womack | 126/449 |
| 4,281,641 | 8/1981 | DeVore | 126/446 |
| 4,307,712 | 12/1981 | Tracy | 126/443 |
| 4,318,393 | 3/1982 | Goldstien | 126/451 |

OTHER PUBLICATIONS

Sanders Associates, 1/4 Megawatt Solar Receiver Final Report, Dept. of Energy Report No. DOE/ET/210-11-1, Oct. 1979.
Carl I, Conceptual Design of a Heat Pipe Solar Receiver Gas Turbine Plant, Foster Wheeler Report, 9-4-1-341106, Sep. 1978.
Boeing Engineering Co., Closed Brayton Cycle Advanced Central Receiver Solar Electric Power, D.O.E. Report, SAN-1726-1, (Nov. 1978).
Bliss, Solar House Heating, World Symposium on Applied Solar Energy, Nov. 1955, pp. 151-158.

Primary Examiner—Daniel J. O'Connor
Attorney, Agent, or Firm—Robert Southworth, III; Richard E. Constant; Richard G. Besha

[57] ABSTRACT

An improved tower-mounted central solar energy receiver for heating air drawn through the receiver by an induced draft fan. A number of vertically oriented, energy absorbing, fin-shaped slats are radially arranged in a number of concentric cylindrical arrays on top of the tower coaxially surrounding a pipe having air holes through which the fan draws air which is heated by the slats which receive the solar radiation from a heliostat field. A number of vertically oriented and wedge-shaped columns are radially arranged in a number of concentric cylindrical clusters surrounding the slat arrays. The columns have two mirror-reflecting sides to reflect radiation into the slat arrays and one energy absorbing side to reduce reradiation and reflection from the slat arrays.

6 Claims, 4 Drawing Figures

CENTRAL SOLAR ENERGY RECEIVER

The United States Government has rights in this invention pursuant to Contract No. DE-AC06-76RLO-1830 between the U.S. Department of Energy and the Battelle Memorial Institute.

BACKGROUND OF THE INVENTION

The present invention relates generally to solar energy receivers and more particularly to an improved point focus central solar energy receiver useful in producing heated air for application to power generation systems and industrial process heat systems.

Existing air heating point focus central solar energy receiver designs for producing air at about 514 degrees centigrade use an intermediate working fluid such as draw salt. The intermediate working fluid can be heated in either a cavity or an open central receiver. Above 514 degrees centigrade air is heated directly in a cavity-type receiver. Most designs involve moving air through a bank of tubes which is exposed to incident solar radiation. The radiation is absorbed on the tubes and transferred to the air. Variations on this approach use heat pipes or impingement heat transfer to improve performance. All of these approaches have several disadvantages. First, the reflection, reradiation, and convective losses from existing receiver designs are about 6 to 15%, depending on operating temperature, even though all of these designs are cavity receivers with associated added spillage losses and large size. Second, due to poor heat transfer between the air and the absorbing surface, a very large heat transfer area is required which, in turn, results in a large receiver.

One particular existing design uses a tower and cross-arm to mount a large bell-shaped ceramic matrix receiver which has solar radiation striking it only from the bottom. The tower must be a relatively tall one for this operation. There is an air inlet orifice on its covered side. Heated air is drawn from the top of the receiver. Combined reflection and reradiation losses are expected to be significant, especially at higher temperatures. In addition, the cavity design would have associated spillage energy losses.

SUMMARY OF THE INVENTION

It is an object of the invention to provide a point focus central solar energy receiver useful in producing heated air for application with power generation systems and industrial process heat systems.

It is another object of the invention to provide a solar energy receiver which reduces spillage, reflection, reradiation, and convection energy losses.

It is an added object of the invention to provide a relatively low cost, compact, solar energy receiver utilizing a short support tower.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, the improved tower-mounted central solar energy receiver, for heating air drawn through an opening on top of the tower by a fan, may comprise a number of vertical, separate, and energy absorbing fin-shaped slats. The slats are placed to form a number of concentric cylindrical arrays which encircle the opening on top of the tower. The slats are radially positioned, in their concentric cylindrical arrays, with respect to the arrays' single axis. The slats in any particular array are not radially aligned with respect to the slats in an adjoining array. The slats absorb solar energy and heat the nearby air. An airflow distribution device guides the fan-pulled heated air from near the slats to the opening on top of the tower.

Preferably the airflow distribution device includes a vertical pipe with air holes. The pipe is placed within the innermost slat array and connects with the opening on top of the tower.

In a further aspect of the present invention, in accordance with its objects and purposes, the solar energy receiver hereof may also comprise a number of vertical, separate, wedge-shaped columns. The columns are placed to form a number of concentric cylindrical clusters which are coaxial with, and encircle, the slat arrays. The columns are radially positioned, with respect to the slat arrays' single axis, in their concentric cylindrical clusters. Each column has two equal, outwardly pointing, mirror-like sides which reflect the solar energy inward to the slats. Each column also has one radially inwardly pointing, energy absorbing side which blocks reflection and reradiation outward from the slats. Slats and columns in any particular array or cluster are not radially aligned with respect to the slats or columns in an adjoining array or cluster.

Several benefits and advantages are derived from the invention. The invention's slat arrays and surrounding column clusters reduce receiver reflection and reradiation energy losses. The invention's airflow distribution means reduces receiver convection losses by drawing the heated air cylindrically inward through the receiver to the central pipe for application to a power generation system, etc. The invention's open-type receiver reduces spillage energy losses. By receiving the solar radiation over a complete cylindrical surface, the invention provides a solar energy receiver that may be relatively compact in size, require a relatively short tower, and be relatively low in cost.

BRIEF DESCRIPTION OF THE DRAWINGS

The accompanying drawings which are incorporated in and form a part of this specification, illustrate several embodiments of the present invention and, together with a description, serve to explain the principles of the invention. In the drawings.

DETAILED DESCRIPTION OF THE INVENTION

Reference will now be made in detail to the present preferred embodiments of the invention, examples of which are illustrated in the accompanying drawings.

Figure 1:
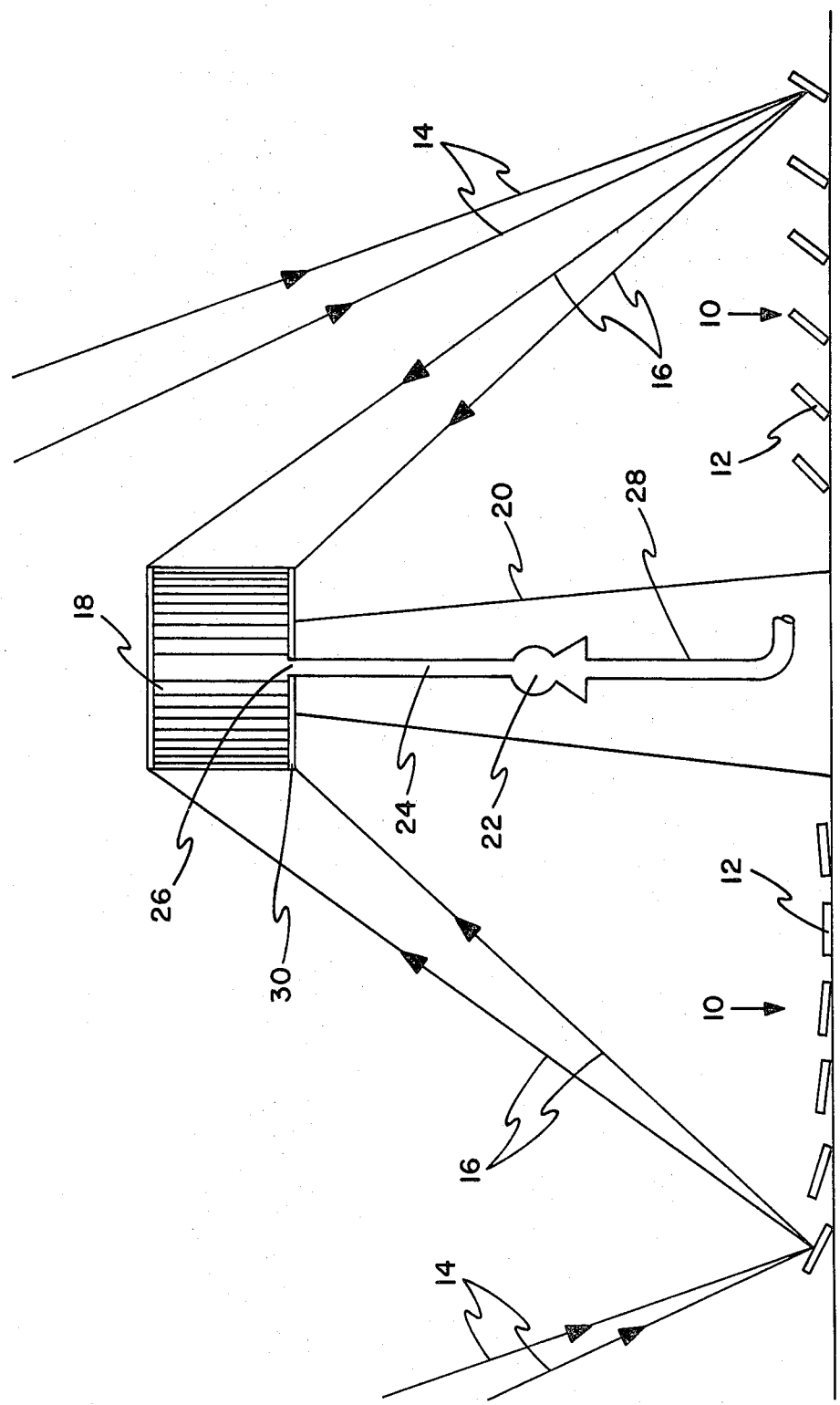
FIG. 1 is a schematic diagram of a system for heating air using the central solar energy receiver mounted on top of a tower surrounded by a heliostat field.

FIG. 1 shows the employment of the point focus central solar energy receiver 18 in producing heated air. The receiver 18 is attached to the top 30 of a tower 20 which is surrounded by a heliostat field 10. Each mirror 12 in the heliostat field 10 receives incoming solar radiation 14 from the sun and directs reflected solar radiation 16 to the receiver 18. The receiver 18 transfers heat energy to the air in its vicinity by convection. A low pressure, induced draft fan 22 draws the heated air from an air inlet orifice 26, located on top of the tower 20, through inlet ductwork 24 and exhausts the heated air through outlet ductwork 28 to be used, for example, in a process heat system or a power generation system.

The process heat system (not shown in the drawings) would use the heated air from the outlet ductwork 28 to charge a multiple vessel pebble bed, checker stove, or other appropriate thermal storage subsystem. Process heat is provided by a forced draft fan which blows air through the storage subsystem producing heated air. This arrangement could also be used with a Brayton-cycle heat engine to produce electric power. For lower temperature applications hot air can be supplied directly from the outlet ductwork 28.

The power generation system (not shown in the drawings) could include a steam generator located below the receiver 18 in the support tower 20. Hot air from the receiver 18 transfers energy to the water to generate superheated steam for a steam Rankine cycle power plant. The air exiting the steam generator is blown back into the receiver 18 by a recirculating fan to mix with incoming air and provide preheated air and to reduce convective loses by preventing the formation of natural convection cells. In this arrangement the receiver 18 is analogous to the furnace in a power plant and the steam generator is similar to the convective passes.

Figure 2:
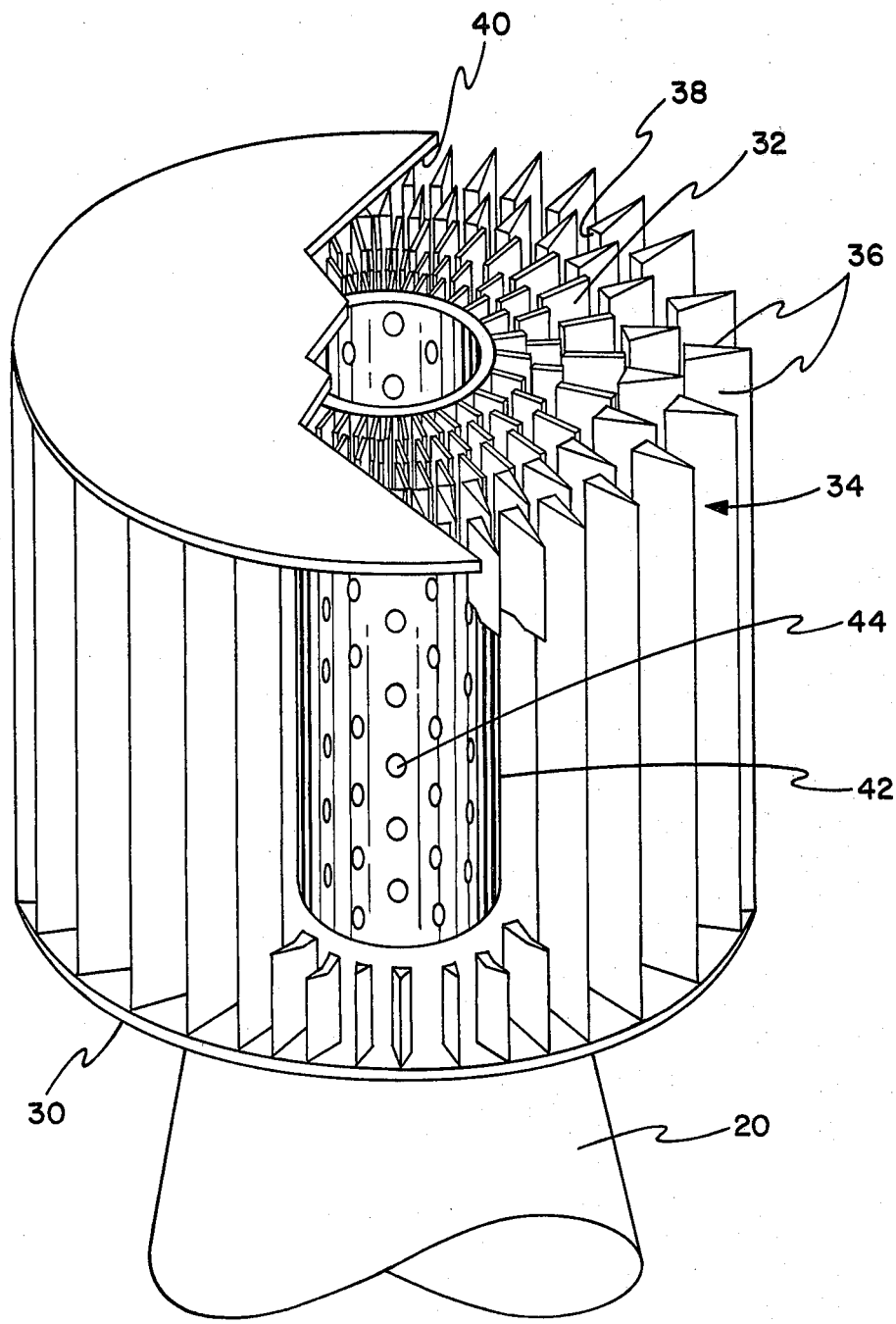
FIG. 2 is a partial cutaway view of the solar energy receiver of FIG. 1.
Figure 3:
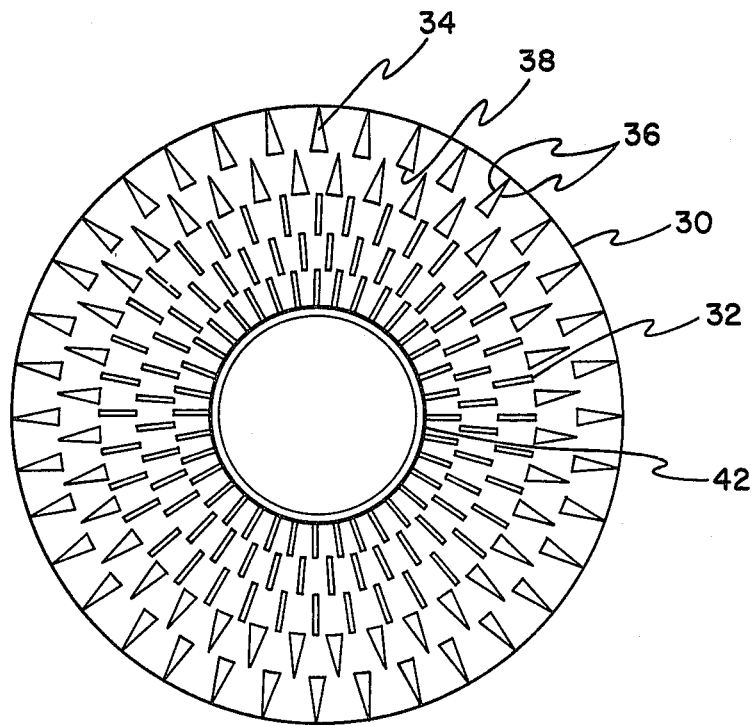
FIG. 3 is a top view of the solar energy receiver of FIG. 2 with the roof member removed.

FIGS. 2 and 3 show the solar energy receiver 18 in greater detail. The receiver 18 uses an arrangement of a number of generally vertically oriented slats 32 on top of the tower 20 to absorb solar radiation from the heliostat field and transfer energy by convection to heat the air in the vicinity of the slats 32. The receiver 18 also uses an airflow distribution means to direct the heated air as it moves from the vicinity of the slats 32 to the air inlet orifice 26 under the pull of the induced draft fan 22.

Figure 4:
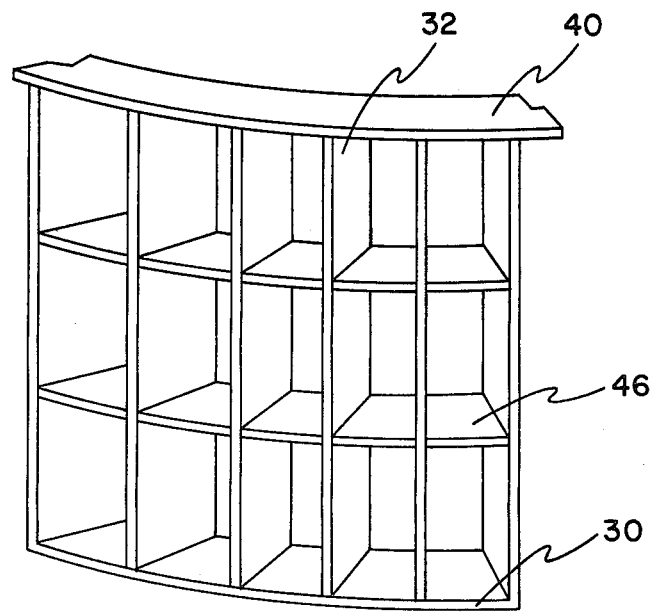
FIG. 4 is a perspective view of part of one cylindrical array of generally vertically oriented slats of the solar energy receiver of FIG. 2, with the addition of generally horizontally oriented pins.

The slats 32 are fin-shaped, elongated, and are made of a solar energy absorbing material such as a ceramic (for high operating temperature applications) or a steel (for low operating temperature applications). The slats 32 are grouped into a number of concentric cylindrical arrays which surround the air inlet orifice 26. The concentric cylindrical arrays have a common axis. The slats 32 in the concentric cylindrical arrays are spaced-apart with each slat 32 being generally radially oriented with respect to the arrays' common axis. The fin-shaped slats 32 have a large surface area relative to the area exposed to solar radiation, so good convective heat transfer between the slats and the air can be expected. The length of the slats 32 is determined by the required heat transfer area for heat transfer between the slats 32 and the air. The amount of energy absorbed in one array is determined by the cross-sectional area perpendicular to the direction of incident radiation and the absorptivity of the slats. By varying the absorptivity between arrays, the amount of energy absorbed in any one array can be tailored to meet other criteria, such as heat transfer constraints. The slats 32 in adjacent arrays are not radially aligned with respect to each other. Preferably, the slats 32 of alternate arrays are radially aligned with respect to each other. In some applications, it may be desirable to have the radial distance of the top of the slats 32 from the common axis be greater than the radial distance of the bottom of the slats 32 from that axis. The curving or tilting of the slats 32 would generally be slight to achieve a more perpendicular orientation with respect to the incoming reflected solar radiation 16 from the mirrors 12 of the heliostat field 10. In other applications, the slat surface could be roughened to improve heat transfer. An option, to increase the structural integrity of the slat 32 arrangement, is to attach a number of spaced-apart, elongated fin-shaped pins 46 in a generally horizontal orientation to one or more of the concentric cylindrical arrays of generally vertically oriented slats 32. These solar energy absorbing pins 46 are shown in FIG. 4.

Preferably, the airflow distribution means includes an inlet manifold, such as an elongated cylindrically-shaped pipe 42 which is made of a solar energy absorbing material. The pipe 42 contains a number of air holes 44 in its cylindrical wall, and is generally vertically oriented and coaxially positioned with respect to the common axis of the concentric cylindrical arrays of slats 32. The radially innermost slat array surrounds the pipe 42. The bottom of the pipe 42 is attached to the air inlet orifice 26 on the top 30 of the tower 20. The pipe 42 both absorbs any incident radiation which passes through the slats 32 and distributes airflow in the receiver 18 to prevent hot spots and recirculation. Depending on operating temperature, the pipe 42 can be fabricated from either carbon steel, alloys, or ceramics. Other means include octagonal, hexagonal or other shaped pipe or duct, pipes having air holes which vary in diameter and/or number with distance from the air inlet orifice, and the like.

To improve performance, the solar energy receiver 18 also uses a grouping of a number of generally vertically oriented columns 34 on top of the tower 20 to help reflect solar radiation from the heliostat field generally inward to the slats 32, and to help block any reflection and reradiation coming outward from the slats 32. The columns 34 are triangular-prism (wedge) shaped, elongated, and are generally made of a metal. The columns 34 are arranged, coaxially about the slat arrays' common axis, into a number (usually two) of concentric cylindrical clusters which surround the slat arrays. The columns 34 in the concentric cylindrical clusters are spaced-apart with each column 34 generally radially oriented with respect to the slat arrays' common axis. Each column 34 has two generally equal and outwardly facing, specular reflecting sides 36 which reflect the incoming solar radiation 16 from the mirrors 12 generally inward toward the slats 32. Each column 34 also has one radially inwardly facing, solar energy absorbing side 38 which blocks reflection and reradiation outward from the slats 32. The columns 34 have a low operating temperature and are generally made of a metal (such as carbon steel) with polished specular reflecting sides 36 and, for example, a black-colored energy absorbing side 38. The energy-absorbing side 38 could even be a ceramic sheet layer attached to the column 34. The slats 32 and columns 34 in adjacent arrays and clusters are not radially aligned with respect to each other. Preferably, the slats 32 and columns 34 in alternate arrays and clusters are radially aligned with respect to each other.

The bottoms of the columns 34 are directly attached to the top 30 of the tower 20. Although the bottoms of the slats 32 also could be directly attached to the tower's top 30, it is preferred that the tops of the slats 32 be attached to a solar energy receiver roof member 40 which is supported by the tops of the columns 34. The slats 32 would hang clear of the tower's top 30 to permit downward thermal expansion of the slats 32 during heating.

A preliminary mathematical performance analysis paper study of the solar energy receiver 18 showed substantial improvement in performance and cost when compared with other air heating receiver schemes. In using just slats 32, the addition of successive slat arrays should tend to reduce the apparent reflectivity of the receiver, with a reduction in reflectivity of approximately 50% for 15 or more slat arrays. The marginal utility of each successive slat array in reducing reflectivity should decrease until there is little incentive for adding more than 20 slat arrays. The two column 34 clusters when combined with the many slat 32 arrays should reduce apparent reflectivity by 91% when compared to an open receiver of the same dimensions and material optical properties. The solar energy receiver should perform as a cavity receiver but retain the shape and optical advantages of an open receiver (e.g., reduced spillage losses). The analysis also showed that the multiple slat arrays should reduce reradiation by 12%. The two column clusters should reduce reradiation from the slat arrays to 14% of the reradiation losses that would be expected without the column clusters. For a 14.6 meter diameter, 9.1 meter high, and 300 megawatt (thermal) receiver, with two column clusters and 13 slat arrays, and an air mass flow rate of 828,000 kilograms per hour, the combined reflection and reradiation losses should be below 2.4% even for producing process heated air as hot as 1,093 degrees centigrade. Combined losses should be even lower for the case of 514 degree centigrade heated air flowing at 1,890,000 kilograms per hour. Convective losses have not been mathematically estimated but should be minimized because the heated air is drawn into the receiver.

The operation of the solar energy receiver 18 is as follows. Solar radiation 16 from a surrounding heliostat field 10 is focused on the receiver 18 and is absorbed by the slats 32. Air is drawn through to the middle of the slat arrays and into air holes 44 on a central pipe 42 by means of an induced draft fan 22. The moving air is heated by contact with the slats 32 and is used for a power generation system or an industrial process heat system. The outer two clusters of wedge-shaped columns 34 have two specular reflecting sides 36 which reflect radiation 36 into the slat arrays and one energy absorbing side 38 which reduces reradiation and reflection losses outward from the slat arrays.

In summary, an improved central solar energy air heating receiver is achieved by drawing air through holes in a manifold or vertically oriented cylindrical pipe surrounded by a number of radially oriented, energy absorbing, fin-shaped slats arranged into coaxial concentric cylindrical arrays with the outermost slat array surrounded by a number of radially oriented, specular reflecting, triangular-prism shaped columns arranged into coaxial concentric cylindrical clusters.

The foregoing description of several preferred embodiments of the invention has been presented for purposes of illustration and description. It is not intended to be exhaustive or to limit the invention in the precise form disclosed, and obviously many modifications and variations are possible in light of the above teaching. The embodiments were chosen and described in order to best explain the principles of the invention and it's practical application to thereby enable others skilled in the art to best utilize the invention in various embodiments and with various modifications as are suited to the particular use contemplated. It is intended that the scope of the invention be defined by the claims appended hereto.

I claim:

1. An improved point focus central solar energy receiver, mounted on top of a tower surronded by a heliostat field, for heating air, in the vicinage of said receiver, which is then drawn by a low pressure, induced draft fan through ductwork having an air inlet orifice on top of said tower, wherein the improvement comprises:
    (a) a first plurality of solar energy absorbing, spaced-apart, and generally vertically oriented, elongated fin-shaped slats disposed in a first pluralism of concentric cylindrical arrays having a common axis and surrounding said air inlet orifice, with each of said slats generally radially oriented with respect to said axis and with said slats of adjacent said arrays not radially aligned with respect to each other, and wherein said slats absorb said solar energy from said heliostat field and reradiate heat energy to produce heated air in the vicinity of said slats; and
    (b) means for distributing airflow of said heated air, which is pulled by said fan, from said vicinity of said slats to said air inlet orifice.

2. The improved solar energy receiver of claim 1, wherein said improvement also includes:
    (c) a second plurality of spaced-apart and generally vertically oriented, elongated triangular prism-shaped columns coaxially disposed about said axis in a second pluralism of concentric cylindrical clusters surrounding said first pluralism of said arrays, with each of said columns radially oriented with respect to said axis, having two outwardly facing, specular reflecting, and generally equal sides and one radially inwardly facing and solar energy absorbing side, and with said slats and columns of adjacent said arrays and clusters not radially aligned with respect to each other, and wherein said specular reflecting sides reflect said solar energy from said heliostat field generally inward toward said slats and wherein said energy absorbing side blocks reflection and reradiation outward from said slats.

3. The improved solar energy receiver of claim 2, wherein the bottom of each of said columns is attached to the top of said tower and wherein said improvement also includes:
    (d) a roof member, attached to the top of each of said columns, having said slats depending therefrom.

4. The improved solar energy receiver of claim 3, wherein said improvement also includes:
    (e) a third plurality of solar energy absorbing, spaced-apart, and generally horizontally oriented, elongated fin-shaped pins attached to a said array.

5. The improved solar energy receiver of claim 4, wherein said slats comprise ceramic slats and said columns comprise metallic columns.

6. The improved solar energy receiver of claims 1, 2, 3, 4, or 5, wherein said airflow distribution means includes a solar energy absorbing and generally vertically oriented, elongated cylindrically-shaped pipe coaxially disposed with respect to said axis, said pipe surrounded by the radially innermost of said arrays of said slats, having a bottom terminus attached to said air inlet orifice, and having a cylindrical wall containing air holes.

* * * * *